United States Patent
Guan et al.

(10) Patent No.: US 11,316,158 B2
(45) Date of Patent: Apr. 26, 2022

(54) SECONDARY BATTERY, AND RELATED BATTERY MODULE, BATTERY PACK AND APPARATUS

(71) Applicant: Contemporary Amperex Technology Co., Limited, Ningde (CN)

(72) Inventors: Yingjie Guan, Ningde (CN); Yuzhen Zhao, Ningde (CN); Yan Wen, Ningde (CN); Qisen Huang, Ningde (CN); Xin Liu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/159,138

(22) Filed: Jan. 26, 2021

(65) Prior Publication Data

US 2021/0151751 A1    May 20, 2021

Related U.S. Application Data

(63) Continuation of application No. PCT/CN2020/100990, filed on Jul. 9, 2020.

(30) Foreign Application Priority Data

Jul. 16, 2019    (CN) .......................... 201910638890.1

(51) Int. Cl.
*H01M 4/505* (2010.01)
*H01M 4/36* (2006.01)
(Continued)

(52) U.S. Cl.
CPC .......... *H01M 4/505* (2013.01); *H01M 4/364* (2013.01); *H01M 4/483* (2013.01); *H01M 4/525* (2013.01);
(Continued)

(58) Field of Classification Search
None
See application file for complete search history.

(56) References Cited

U.S. PATENT DOCUMENTS

| 8,895,189 B2 | 11/2014 | Zhamu et al. |
| 2015/0263379 A1* | 9/2015 | Xiao ................. H01M 10/0445 429/161 |

(Continued)

FOREIGN PATENT DOCUMENTS

| CN | 105283986 A | 1/2016 |
| CN | 106067543 A | 11/2016 |

(Continued)

OTHER PUBLICATIONS

Nternational Search Report for PCT/CN2020/100990, dated Jul. 16, 2020, 18 pages.

(Continued)

*Primary Examiner* — Jonathan Crepeau
*Assistant Examiner* — Angela J Martin
(74) *Attorney, Agent, or Firm* — Law Offices of Liaoteng Wang

(57) ABSTRACT

The present application provide a secondary battery and related battery module, battery pack and apparatus. The secondary battery includes a positive electrode plate, a negative electrode plate, a separator and an electrolyte, wherein the secondary battery includes a positive active material selected from one or more of layered lithium nickel cobalt manganese oxide and layered lithium nickel cobalt aluminum oxide, and a negative active material including graphite and silicon-oxygen compound; the delithiation capacity A of the negative electrode film in the voltage range of 0.005V to the delithiation platform voltage and the delithiation capacity B of the negative electrode film in the voltage range of the delithiation platform voltage to 1.2V (Continued)

satisfy: $1 \leq A/B \leq 2$; and when the secondary battery is discharged to a voltage of 2.5V, the voltage U of the negative electrode plate relative to a lithium metal reference electrode satisfies: $0.5V \leq U \leq 0.7V$.

14 Claims, 2 Drawing Sheets

(51) Int. Cl.
*H01M 4/48* (2010.01)
*H01M 4/525* (2010.01)
*H01M 4/587* (2010.01)
*H01M 10/0525* (2010.01)
*H01M 4/02* (2006.01)

(52) U.S. Cl.
CPC ....... *H01M 4/587* (2013.01); *H01M 10/0525* (2013.01); *H01M 2004/021* (2013.01)

(56) References Cited

U.S. PATENT DOCUMENTS

| | | | | |
|---|---|---|---|---|
| 2016/0028062 | A1* | 1/2016 | Kim | H01M 10/052 429/223 |
| 2017/0170476 | A1 | 6/2017 | Yamamoto et al. | |
| 2018/0375158 | A1* | 12/2018 | Morinaka | H01M 4/505 |
| 2019/0058210 | A1* | 2/2019 | Dai | H01M 10/0525 |
| 2019/0177551 | A1* | 6/2019 | Nagai | H01M 4/133 |
| 2020/0388874 | A1* | 12/2020 | Dawley | H01M 10/0525 |

FOREIGN PATENT DOCUMENTS

| | | |
|---|---|---|
| CN | 106207264 A | 12/2016 |
| CN | 106450481 A | 2/2017 |
| CN | 107248451 A | 10/2017 |
| CN | 107251304 A | 10/2017 |
| CN | 109314269 A | 2/2019 |
| CN | 109509909 A | 3/2019 |
| CN | 109524621 A | 3/2019 |
| CN | 109671999 A | 4/2019 |
| CN | 109786841 A | 5/2019 |
| CN | 109817473 A | 5/2019 |
| CN | 109920987 A | 6/2019 |
| EP | 3396771 A1 | 10/2018 |

OTHER PUBLICATIONS

Nternational Search Report for PCT/CN2020/100990, dated Oct. 12, 2020, 11 pages.
European Search Report for Application No. 20827980.2, dated Sep. 14, 2021, 9 pages.
Chinese first Office Action for Application/Publication No. 201910638890.1, dated Jul. 20, 2021, 11 pages.
The Decision to grant for Chinese Application No. 201910638890.1 with a search report, dated Nov. 3, 2021, 6 pages.
The First Office Action for European Application No. 20827980.2, dated Feb. 22, 2022, 5 pages.

* cited by examiner

SECONDARY BATTERY, AND RELATED BATTERY MODULE, BATTERY PACK AND APPARATUS

CROSS-REFERENCE TO RELATED APPLICATION

The present invention is a continuation of International Application No. PCT/CN2020/100990, filed on Jul. 9, 2020, which claims priority to Chinese Patent Invention No. 201910638890.1, filed on Jul. 16, 2019, titled with "Secondary Battery Using", both of which are hereby incorporated by reference in their entireties.

TECHNICAL FIELD

This application belongs to the technical field of energy storage apparatus, and specifically relates to a secondary battery, and related battery module, battery pack and apparatus.

BACKGROUND

With the increasing attention to environmental protection, environmentally friendly secondary batteries are gradually being applied to consumer electronics and electric vehicles. Among them, the energy density and cycle life of batteries are increasingly being valued by end consumers. Compared with traditional carbon-based materials, silicon-based materials have a very high theoretical gram capacity, which is about ten times that of carbon-based materials. Therefore, silicon-based materials have been widely studied.

However, the swelling problem of silicon-based materials is serious during use, resulting in deterioration of battery cycle performance, which greatly limits the application of silicon-based materials in commercial products.

SUMMARY

A first aspect of the present application provides a secondary battery, including a positive electrode plate, a negative electrode plate, a separator and an electrolyte, wherein the positive electrode plate includes a positive electrode current collector and a positive electrode film disposed on at least one surface of the positive electrode current collector, wherein the positive electrode film includes a positive active material, the negative electrode plate includes a negative electrode current collector and a negative electrode film disposed on at least one surface of the negative electrode current collector, wherein the negative electrode film includes a negative active material;

the positive active material includes one or more of layered lithium nickel cobalt manganese oxide and layered lithium nickel cobalt aluminum oxide;

the negative active material includes graphite and silicon-oxygen compound $SiO_x$, in which $0<x<2$;

when a button battery made from the negative electrode plate and a lithium metal sheet is subjected to constant-current lithium intercalation at a rate of 0.1 C to a voltage of 0.005V, and then subjected to constant-current lithium intercalation at a rate of 0.05 C to a voltage of 0.005V, and then subjected to constant-current lithium deintercalation at a rate of 0.1 C to a voltage of 1.2V, a ratio of total delithiation energy of the negative electrode film to total delithiation capacity in the voltage range of 0.005V to 1.2V is defined as the delithiation platform voltage, and the delithiation capacity of the negative electrode film in the voltage range of 0.005V to the delithiation platform voltage is defined as A, and the delithiation capacity of the negative electrode film in the voltage range of the delithiation platform voltage to 1.2V is defined as B, and A and B satisfy: $1 \leqslant A/B \leqslant 2$; and when the secondary battery is discharged to a voltage of 2.5V, the voltage U of the negative electrode plate relative to a lithium metal reference electrode satisfies: $0.5V \leqslant U \leqslant 0.7V$.

It is surprisingly found that in the secondary battery provided in the present application, the positive active material includes one or more of layered lithium nickel cobalt manganese oxide and layered lithium nickel cobalt aluminum oxide, and the negative active material includes silicon-oxygen compound and graphite, and at the same time the A/B value of the negative electrode plate and the voltage U value of the negative electrode plate when the battery is discharged to 2.5V are within a specific range, making the battery have high energy density, initial coulombic efficiency and a better cycle life.

In any of the foregoing embodiments, optionally, A/B is from 1.1 to 1.6, or from 1.2 to 1.5. A/B value within the given range can better enable the battery to have both higher energy density, initial coulombic efficiency and a better cycle life.

In any of the foregoing embodiments, when the secondary battery is discharged to a voltage of 2.5V, the voltage U of the negative electrode plate relative to the lithium metal reference electrode may be from 0.55V to 0.65V. The value of the voltage U within an appropriate range can better enable the battery to have both higher energy density, initial coulombic efficiency and better cycle performance.

In any of the above embodiments, the graphite can be selected from one or more of artificial graphite and natural graphite. The graphite can improve the cycle performance and energy density of the secondary battery.

In any of the foregoing embodiments, the mass percentage ω of the silicon-oxygen compound in the negative active material satisfies $5\% \leqslant \omega \leqslant 40\%$; optionally, $15\% \leqslant \omega \leqslant 35\%$. Within the given range, the energy density and cycle performance of the battery can be further improved.

In any of the foregoing embodiments, the negative active material further satisfies one or more of the following aspects:

the average particle size $D_v50_a$ of the negative active material is from 5 μm to 20 μm;

optionally, from 6 μm to 15 μm;

the average particle size $D_v50_b$ of the silicon-oxygen compound is from 3 μm to 12 μm; optionally, from 4 μm to 10 μm;

the average particle size $D_v50_c$ of the graphite is from 5 μm to 18 μm; optionally, from 6 μm to 15 μm.

One or more of $D_v50_a$, $D_v50_b$, and $D_v50_c$ within the given range can further improve the cycle performance of the secondary battery, and is also beneficial to increasing the energy density of the secondary battery.

In any of the foregoing embodiments, the lithium nickel cobalt manganese oxide can be selected from one or more of the compounds represented by Formula 1 and a surface coating modified compounds thereof

  Formula 1,

In Formula 1, $0.8 \leqslant a \leqslant 1.2$, $0.5 \leqslant b<1$, $0<c<1$, $0<d<1$, $0 \leqslant e \leqslant 0.1$, $1 \leqslant f \leqslant 2$, $0 \leqslant g \leqslant 1$, $M^1$ is selected from one or more of Zr, Al, Zn, Cu, Cr, Mg, Fe, V, Ti, and B, and A is selected from one or more of N, F, S, and Cl; and/or, the lithium nickel cobalt aluminum oxide can be selected from one or more of the compounds represented by Formula 2 and the surface coating modified compounds thereof,

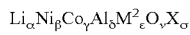
Formula 2,

In Formula 2, $0.8 \leq \alpha \leq 1.2$, $0.5 \leq \beta <1$, $0<\gamma<1$, $0<\delta<1$, $0 \leq \varepsilon \leq 0.1$, $1 \leq \nu \leq 2$, $0 \leq \sigma \leq 1$, $M^2$ is selected from one or more of Zr, Mn, Zn, Cu, Cr, Mg, Fe, V, Ti, and B, and X is selected from one or more of N, F, S, and Cl.

The lithium nickel cobalt manganese oxide and/or lithium nickel cobalt aluminum oxide may have a higher gram capacity, thereby improving the energy density of the secondary battery.

In any of the foregoing embodiments, at least a part of the positive active material has a single-particle morphology. The use of such positive active material can improve the energy density and cycle performance of the secondary battery.

In any of the foregoing embodiments, the coefficient of excess capacity of the secondary battery may be from 1.05 to 1.3, and optionally from 1.1 to 1.2. The coefficient of excess capacity of the secondary battery within the given range can increase the energy density of the secondary battery and is beneficial to preventing the negative electrode film from lithium precipitation during the cycle.

In any of the foregoing embodiments, the negative electrode film has an areal density p satisfying $7 \text{ mg/cm}^2 \leq \rho \leq 10 \text{ mg/cm}^2$; optionally, $7 \text{ mg/cm}^2 \leq \rho \leq 9 \text{ mg/cm}^2$. When the areal density of the negative electrode film is within the range, the secondary battery can have higher energy density and better dynamic performance at the same time.

A second aspect of the present application provides a battery module including the secondary battery according to the first aspect of the present application.

A third aspect of the present application provides a battery pack including the battery module according to the second aspect of the present application.

A fourth aspect of the present application provides an apparatus including the secondary battery according to the first aspect of the present application.

The battery module, battery pack, and apparatus of the present application include the secondary battery described in the present application, and therefore have at least the same or similar technical effects.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

Figure 1:
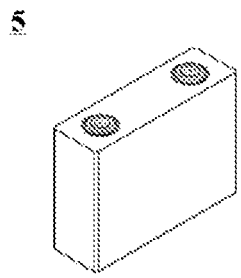
FIG. 1 is a schematic diagram of an embodiment of a secondary battery.

In order to make the purpose, technical solutions, and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

The present application provides a secondary battery comprising a positive electrode plate, a negative electrode plate, a separator and an electrolyte.

The positive electrode plate comprises a positive electrode current collector and a positive electrode film disposed on at least one surface of the positive electrode current collector. For example, the positive electrode current collector has two opposite surfaces in its thickness direction, and the positive electrode film is disposed on either or both of the two surfaces.

The positive electrode plate comprises a positive active material, and the positive active material comprises one or more of layered lithium nickel cobalt manganese oxide and layered lithium nickel cobalt aluminum oxide.

The negative electrode plate comprises a negative electrode current collector and a negative electrode film disposed on at least one surface of the negative electrode current collector. For example, the negative electrode current collector has two opposite surfaces in its thickness direction, and the negative electrode film is disposed on either or both of the two surfaces.

The negative electrode plate comprises a negative active material, and the negative active material comprises graphite and silicon-oxygen compound $SiO_x$, in which $0<x<2$;

when a button battery made from the negative electrode plate and a lithium metal sheet is subjected to constant-current lithium intercalation at a rate of 0.1 C to a voltage of 0.005V, and then subjected to constant-current lithium intercalation at a rate of 0.05 C to a voltage of 0.005V, and then subjected to constant-current lithium deintercalation at a rate of 0.1 C to a voltage of 1.2V, a ratio of total delithiation energy of the negative electrode film to total delithiation capacity in the voltage range of 0.005V to 1.2V is defined as the delithiation platform voltage, and the delithiation capacity of the negative electrode film in the voltage range of 0.005V to the delithiation platform voltage is defined as A, and the delithiation capacity of the negative electrode film in the voltage range of the delithiation platform voltage to 1.2V is defined as B, and A and B satisfy: $1 \leq A/B \leq 2$; and when the secondary battery is discharged to a voltage of 2.5V, the voltage U of the negative electrode plate relative to a lithium metal reference electrode satisfies: $0.5 \leq U \leq 0.7V$.

It should be noted that the preparation process of the button battery can refer to national standards or industry specifications. For example, the negative active material and the customary binder and conductive agent in the industry can be prepared into the above-mentioned electrode containing the negative electrode film, and then a lithium metal disc is used as the counter electrode, and the customary electrolyte in the industry can be added to prepare the button battery.

As a specific example, a button battery can be prepared as follows:

dispersing the selected negative active material, conductive agent, and binder in a solvent (such as water) according to a certain mass ratio to make a negative electrode slurry, then coating it on a copper foil, drying to remove the solvent, cutting, and pressing, to prepare a circular electrode plate containing the above-mentioned negative electrode film; and then using a small lithium metal disc as a counter electrode, and adding an electrolyte, and assembling them in a glove box to prepare the button battery. The electrolyte can be obtained by the following process: homogeneously mixing ethylene carbonate (EC), ethyl methyl carbonate (EMC), and diethyl carbonate (DEC) in a volume ratio of 1:1:1 to obtain an organic solvent, and dissolving the fully dried lithium salt $LiPF_6$ in the organic solvent, and then adding fluoroethylene carbonate (FEC) and mixing uniformly to obtain an electrolyte, wherein the concentration of $LiPF_6$ is 1 mol/L and the mass percentage of FEC in the electrolyte is 6%.

When the secondary battery is discharged to a voltage of 2.5V, the voltage U of the negative electrode plate can be tested using methods known in the art. For example, it can be measured by the following test method: when making a secondary battery, a lithium metal reference electrode is embedded to form a three-electrode structure secondary battery. The voltage difference between the negative electrode plate and the reference electrode is the voltage U of the negative electrode plate.

As a specific example of the embedded lithium metal reference electrode: during the preparation of the secondary battery, a copper wire having a diameter of 300 μm and uniformly plated with metallic lithium on the surface thereof (or a copper wire not plated with metallic lithium is used, and after assembling into a secondary battery, the positive electrode and the copper wire electrode are connected to charge to depositing the active lithium ion in the positive electrode on the surface of the copper wire; similarly, the negative electrode and the copper wire are connecting to discharge, and the active lithium ions in the negative electrode can also be deposited on the surface of the copper wire, so that the surface of the copper wire is evenly plated with a layer of lithium metal) is placed between the positive electrode plate and the negative electrode plate (a person skilled in the art can adjust the diameter according to actual needs), and a separator is placed between the positive electrode plate and the copper wire, and between the negative electrode plate and the copper wire, respectively, to prevent short circuit between the positive electrode plate or the negative electrode plate and the copper wire plated with lithium metal on the surface.

In the secondary battery of the present application, the positive active material comprises one or more of layered lithium nickel cobalt manganese oxide and layered lithium nickel cobalt aluminum oxide, and the negative active material comprises silicon-oxygen compound and graphite, which is conducive to making the secondary battery have a higher energy density.

The applicant's intensive research has found that when the secondary battery having both the A/B value of the negative electrode film and the voltage U value of the negative electrode plate within an appropriate range, it can effectively increase the amount of active lithium ions that can be stored in the negative electrode film. It also helps to maintain the stability of the SEI (solid electrolyte interface) film on the surface of the silicon-oxygen compound and the stability of the conductive network in the negative electrode film. At the same time, it can ensure that the capacity of the positive active material is fully utilized, thereby greatly improving the energy density, initial coulombic efficiency and cycle performance of the secondary battery.

In the secondary battery of the present application, the ratio A/B of the delithiation capacity A of the negative electrode film in the voltage range from 0.005V to the delithiation platform voltage to the delithiation capacity B in the voltage range from the delithiation platform voltage to 1.2V can be at most 2, at most 1.95, at most 1.9, at most 1.85, at most 1.8, at most 1.75, at most 1.7, at most 1.65, at most 1.6, at most 1.55, at most 1.5, at most 1.45, at most 1.4, or at most 1.35. Optionally, A/B can be at least 1, at least 1.1, at least 1.15, at least 1.2, at least 1.25, at least 1.28, or at least 1.3. Further optionally, A/B can be from 1.1 to 1.6; or from 1.2 to 1.5.

The A/B value within the given range can better enable the battery to have both higher energy density, initial coulombic efficiency and better cycle performance.

In the secondary battery of the present application, it is possible to adjust the mass ratio of the silicon-oxygen compound in the negative active material, the type and content of the binder, the type and content of the conductive agent, etc., so that A/B is in the range described above.

In the secondary battery of the present application, the silicon-oxygen compound $SiO_x$ satisfies $0<x<2$. Optionally, x is from 0.6 to 1.5, or from 0.9 to 1.2.

The silicon-oxygen compound satisfies x within an appropriate range, which enables the silicon-oxygen compound to have higher capacity performance and higher initial coulombic efficiency, and can increase the cycle life of the silicon-oxygen compound, thereby improving the corresponding performance of the secondary battery using the same.

In the secondary battery of the present application, optionally, the powder volume resistivity of the silicon-oxygen compound under a pressure of 16 MPa may be 1000 Ω·cm or less.

In the secondary battery of the present application, optionally, the average particle diameter of the negative active material (that is, the average particle diameter $Dv50_a$ of the mixture of the silicon-oxygen compound and the graphite) may be from 5 μm to 20 μm, or from 6 μm to 15 μm.

In the secondary battery of the present application, optionally, the average particle size $Dv50_b$ of the silicon-oxygen compound may be from 3 μm to 12 μm, or from 4 μm to 10 μm.

$Dv50_b$ is 3 μm or more, which can reduce the film-forming consumption of active lithium ions on the negative electrode, and reduce the side reaction of the electrolyte on the negative electrode, thereby improving the cycle performance of the battery. In addition, a proper $Dv50_b$ can also reduce the amount of binder added in the negative electrode film, which is beneficial to increasing the energy density of the battery. Optionally, $Dv50_b$ is 4 μm or more.

$Dv50_b$ is 12 μm or less, which can increase the migration rate of lithium ions and electrons in the silicon-oxygen compound, and is also beneficial to preventing the silicon-oxygen compound from cracking during charge and discharge, increasing the cycle life of the silicon-oxygen compound, and thereby improving the cycle performance of the battery. Optionally, $Dv50_b$ is 10 μm or less.

In the secondary battery of the present application, optionally, the average particle diameter $Dv50_c$ of the graphite may be from 5 μm to 18 μm, or from 6 μm to 15 μm.

$Dv50_c$ is 5 μm or more, which can reduce the film-forming consumption of active lithium ions on the negative electrode, and reduce the side reaction of the electrolyte on the negative electrode, thereby improving the cycle performance of the battery. In addition, a proper $Dv50_c$ can also reduce the amount of binder added in the negative electrode plate, which is beneficial to increasing the energy density of the battery. Optionally, $Dv50_c$ is 6 μm or more.

$Dv50_c$ is 18 μm or less, which can increase the migration rate of lithium ions and electrons in the graphite, thereby improving the cycle performance of the battery. Optionally, $Dv50_c$ is 15 μm or less.

The average particle size $Dv50_a$ of the negative active material, the average particle size $Dv50_b$ of the silicon-oxygen compound, and the average particle size $Dv50_c$ of the graphite are all well-known in the art, and can be measured with well-known instruments and methods in the art. For example, it can be easily measured with a laser particle size analyzer, such as the Mastersizer 3000 laser particle size analyzer from Malvern Instruments co., Ltd., UK.

In the secondary battery of the present application, the graphite may be one or more of natural graphite and artificial graphite.

In the secondary battery of the present application, optionally, the mass percentage of the negative active material in the negative electrode film is from 90% to 98%, or from 92% to 96%.

In the secondary battery of the present application, optionally, the mass percentage ω of the silicon-oxygen compound in the negative active material satisfies $5\% \leq \omega \leq 40\%$, or $15\% \leq \omega \leq 35\%$. Within the above range, the A/B value can be optimized, and the energy density and cycle performance of the battery can be further improved.

In the secondary battery of the present application, the negative electrode film may optionally contain other negative active materials that can be used for the negative electrode of the secondary battery. As an example, other negative electrode active materials may be one or more of elemental silicon, silicon-carbon composites, silicon alloys, mesocarbon microspheres (MCMB), hard carbon, and soft carbon.

In the secondary battery of the present application, the negative electrode film may also optionally contain a binder and a conductive agent.

The binder in the negative electrode film can be selected from binders known in the art that can be used in secondary batteries. Optionally, the binder includes one or more of styrene-butadiene rubber (SBR), polyacrylic compounds and modified compounds thereof, polyacrylate compounds and modified compounds thereof.

Optionally, the mass percentage of the binder in the negative electrode film is from 1% to 9%, or from 3% to 7%.

The conductive agent in the negative electrode film may be selected from conductive agents known in the art that can be used in secondary batteries. Optionally, the conductive agent includes one or more of conductive carbon black (Super P, abbreviated as SP) and carbon nanotube (Carbon Nanotube, abbreviated as CNT). Further optionally, the conductive agent includes both SP and CNT.

Optionally, the mass percentage of the conductive agent in the negative electrode film is from 1% to 5%, or from 1% to 3%.

In the secondary battery of the present application, optionally, when the secondary battery is discharged to a voltage of 2.5V, the voltage U of the negative electrode plate relative to the lithium metal reference electrode may be at most 0.7, at most 0.68, at most 0.65, at most 0.64, at most 0.63, at most 0.62, at most 0.61, or at most 0.6. Optionally, U can be at least 0.59, at least 0.58, at least 0.57, at least 0.56, at least 0.55, at least 0.54, at least 0.53, at least 0.52, at least 0.51, or at least 0.5. Optionally, U is from 0.55V to 0.65V.

The value of the voltage U within the proper range can better enable the battery to have higher energy density, initial coulombic efficiency and better cycle performance at the same time.

In the secondary battery of the present application, one or more of the following methods can be used to control the above voltage U within the range given in the present application, i.e., pre-replenishing lithium on the negative electrode film, using silicon-oxygen compound with pre-embedded lithium, and adjusting the coefficient of excess capacity (i.e. CB value) of the battery. The coefficient of excess capacity of the battery is the ratio of the capacity of the negative electrode film to the capacity of the positive electrode film with the same area.

In the secondary battery of the present application, a process known in the art can be used for the lithium pre-replenishing process for the negative electrode film. For example, one or more of lithium powder, lithium flakes, and lithium ingots can be used to pre-replenish lithium on the negative electrode film; or a silicon-oxygen compound pre-replenished lithium can be directly used.

In the secondary battery of the present application, the coefficient of excess capacity of the secondary battery can be selected from 1.05 to 1.3, or can be selected from 1.1 to 1.2. The coefficient of excess capacity of the secondary battery within the above range can optimize the voltage U, and is also conducive to the development of the battery capacity, increasing the energy density of the battery, and preventing the negative electrode film from precipitating lithium during the cycle.

In the secondary battery of the present application, optionally, the areal density ρ of the negative electrode film may satisfy $7 \text{ mg/cm}^2 \leq \rho \leq 10 \text{ mg/cm}^2$. Optionally, ρ is from 7 mg/cm² to 9 mg/cm². When the areal density of the negative electrode film is within the range, the secondary battery can have both higher energy density and better dynamic performance. It should be noted that the areal density p mentioned here refers to the areal density of the negative electrode film on any side of the current collector.

In the secondary battery of the present application, the negative electrode current collector can be made of a material with good conductivity and mechanical strength, such as copper foil, but it is not limited thereto.

In the secondary battery of the present application, optionally, the layered lithium nickel cobalt manganese oxide can be selected from one or more of the compounds represented by Formula 1 and a surface coating modified compounds thereof $$Li_aNi_bCo_cMn_dM^1_eO_fA_g \quad \text{Formula 1,}$$

In Formula 1, $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$;

$M^1$ is a cationic doping element, and $M^1$ can be selected from one or more of Zr, Al, Zn, Cu, Cr, Mg, Fe, V, Ti, and B;

A is an anionic doping element, and A can be selected from one or more of N, F, S, and Cl.

In the secondary battery of the present application, optionally, the layered lithium nickel cobalt aluminum oxide can be selected from one or more of the compounds represented by Formula 2 and the surface coating modified compounds thereof, $$Li_\alpha Ni_\beta Co_\gamma Al_\delta M^2_\epsilon O_\nu X_\sigma \quad \text{Formula 2,}$$

In Formula 2, $0.8 \leq \alpha \leq 1.2$, $0.5 \leq \beta < 1$, $0 < \gamma < 1$, $0 < \delta < 1$, $0 \leq \epsilon \leq 0.1$, $1 \leq \nu \leq 2$, $0 \leq \sigma \leq 1$;

$M^2$ is a cationic doping element, and $M^2$ can be selected from one or more of Zr, Mn, Zn, Cu, Cr, Mg, Fe, V, Ti, and B;

X is an anionic doping element, and X can be selected from one or more of N, F, S, and Cl.

The surface coating modified compound may be provided with a coating layer on at least a part of the surface of the material particles, and the coating layer may be a carbon layer, an oxide layer, an inorganic salt layer or a conductive polymer layer. Surface coating modification can further improve the cycle performance of the battery.

Optionally, the carbon layer may include one or more of graphite, graphene, mesocarbon microspheres (MCMB), carbon from hydrocarbon pyrolysis, hard carbon, and soft carbon.

Optionally, the oxide layer may include one or more of Al oxide, Ti oxide, Mn oxide, Zr oxide, Mg oxide, Zn oxide, Ba oxide, Mo oxide, and B oxide.

Optionally, the inorganic salt layer may include one or more of $Li_2ZrO_3$, $LiNbO_3$, $Li_4Ti_5O_{12}$, $Li_2TiO_3$, $Li_3VO_4$, $LiSnO_3$, $Li_2SiO_3$, and $LiAlO_2$.

Optionally, the conductive polymer layer may include one or more of polypyrrole (PPy), poly 3,4-ethylenedioxythiophene (PEDOT), and polyamide (PI).

In the secondary battery of the present application, the positive active material may also optionally comprise other positive active materials that can be used in the positive electrode of the secondary battery. As an example, other positive active materials are, for example, one or more of lithium manganese oxide, lithium iron phosphate, lithium manganese phosphate, and lithium iron manganese phosphate.

In the secondary battery of the present application, optionally, at least a part of the positive active material has a single-particle morphology (i.e., a non-agglomerated particle morphology). The single-particle morphology of the positive active material can improve the overall compacted density and ductility of the positive electrode plate, while reducing the contact area between the positive active material and the electrolyte, reducing the occurrence of interface side reactions, reducing gas production, as such to further improve the cycle performance of lithium-ion batteries.

In the secondary battery of the present application, the positive electrode film may also optionally comprise a binder and a conductive agent. The types of the binder and the conductive agent are not specifically limited, and those skilled in the art can select according to actual needs.

Optionally, the binder in the positive electrode film can be one or more of polyvinylidene fluoride (PVDF), polytetrafluoroethylene (PTFE), polyacrylic acid (PAA), polyvinyl alcohol (PVA), carboxymethyl cellulose sodium (CMC), sodium alginate (SA), polymethacrylic acid (PMAA) and carboxymethyl chitosan (CMCS). The conductive agent in the positive electrode film can be one or more of graphite, superconducting carbon, acetylene black, carbon black, Ketjen black, carbon dots, carbon nanotubes, graphene, and carbon nanofibers.

In the secondary battery of the present application, the positive electrode current collector can be made of a material with good conductivity and mechanical strength, such as aluminum foil, but it is not limited thereto.

In the secondary battery of the present application, the electrolyte comprise an organic solvent and a lithium salt dispersed in the organic solvent. The specific types and compositions of the organic solvent and the lithium salt are not specifically limited, and can be selected according to actual needs.

Optionally, the solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

Optionally, the electrolyte salt may be selected from one or more of $LiPF_6$ (lithium hexafluorophosphate), $LiBF_4$ (lithium tetrafluoroborate), LiTFSI (lithium bistrifluoromethanesulfonimide) and LiTFS (lithium trifluoromethanesulfonate).

The electrolyte may optionally comprise an additive. The additive is not particularly limited and can be selected according to requirements.

In the secondary battery, the separator is disposed between the positive electrode plate and the negative electrode plate to serve as isolation. The type of the separator is not particularly limited, and any well-known porous structure separator having chemical stability and mechanical stability can be selected, such as one or more of glass fiber, non-woven fabric, polyethylene, polypropylene and polyvinylidene fluoride. The separator can be a single-layer film or a multilayer composite film. When the separator is a multilayer composite film, the materials of each layer may be the same or different.

The secondary battery of the present application can be prepared according to conventional methods in the art, for example, a negative active material and optional conductive agent and binder are dispersed in a solvent (such as water)

to form a uniform negative electrode slurry, and the negative electrode slurry is coated on a negative electrode current collector, after drying, cold pressing, etc., the negative electrode plate is obtained; a positive active material and optional conductive agent and binder are dispersed in a solvent (such as N-methylpyrrolidone, referred to as NMP) to form a uniform positive electrode slurry, and the positive electrode slurry is coated on a positive electrode current collector, and the positive electrode plate is obtained after drying and cold pressing, etc.; the positive electrode plate, the separator, and the negative electrode plate are wound in order, so that the separator is located between the positive electrode plate and the negative electrode plate to play a role of isolation, as such to obtain an electrode assembly. The electrode assembly is placed in an outer packaging, and then an electrolyte is injected and sealed to obtain a secondary battery.

The present application has no particular limitation on the shape of the secondary battery, which may be cylindrical, square or other arbitrary shapes. FIG. 1 shows a secondary battery 5 with a square structure as an example.

In some embodiments, the secondary battery may comprise an outer packaging. The outer packaging is used to encapsulate the positive electrode plate, the negative electrode plate and the electrolyte.

Figure 2:
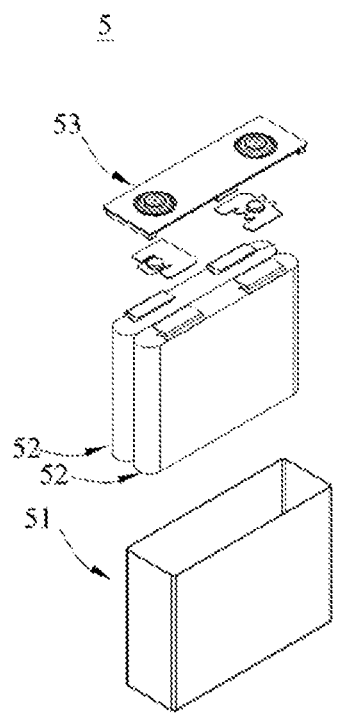
FIG. 2 is an exploded view of FIG. 1.

In some embodiments, referring to FIG. 2, the outer packaging may comprise a housing 51 and a cover 53. Wherein, the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity.

A positive electrode plate, a negative electrode plate and a separator may be formed into an electrode assembly 52 through a winding process or a lamination process. The electrode assembly 52 is packaged in the receiving cavity. The electrolyte that can be an electrolytic solution is infiltrated in the electrode assembly 52. The number of electrode assemblies 52 contained in the battery 5 can be one or more, which can be adjusted according to requirements.

In some embodiments, the outer packaging of the secondary battery may be a hard case, such as a hard plastic case, an aluminum case, or a steel case. The outer packaging of the battery may also be a soft bag, such as a bag-type soft bag. The material of the soft bag can be plastic, such as one or more of polypropylene (PP), polybutylene terephthalate (PBT), polybutylene succinate (PBS).

In some embodiments, the secondary battery may be assembled into a battery module. The number of secondary batteries contained in the battery module can be multiple, and the specific number can be adjusted according to the application and capacity of the battery module.

Figure 3:
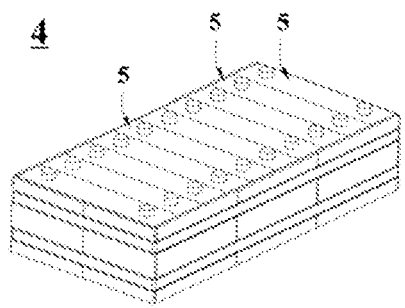
FIG. 3 is a schematic diagram of an embodiment of a battery module.

FIG. 3 is a battery module 4 as an example. Referring to FIG. 3, in the battery module 4, a plurality of secondary batteries 5 may be arranged in sequence along the length direction of the battery module 4. Of course, it can also be arranged in any other manner. Further, the plurality of secondary batteries 5 can be fixed by fasteners.

Optionally, the battery module 4 may further comprise a housing with a receiving space, and a plurality of secondary batteries 5 are accommodated in the receiving space.

In some embodiments, the above-mentioned battery module may also be assembled into a battery pack. The number of battery modules contained in the battery pack can be adjusted according to the application and capacity of the battery pack.

Figure 4:
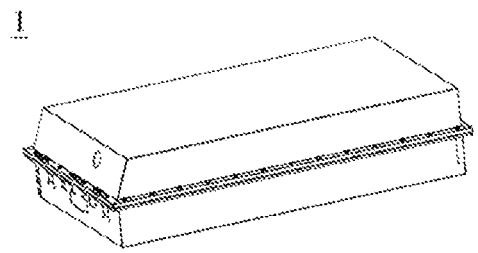
FIG. 4 is a schematic diagram of an embodiment of a battery pack.
Figure 5:
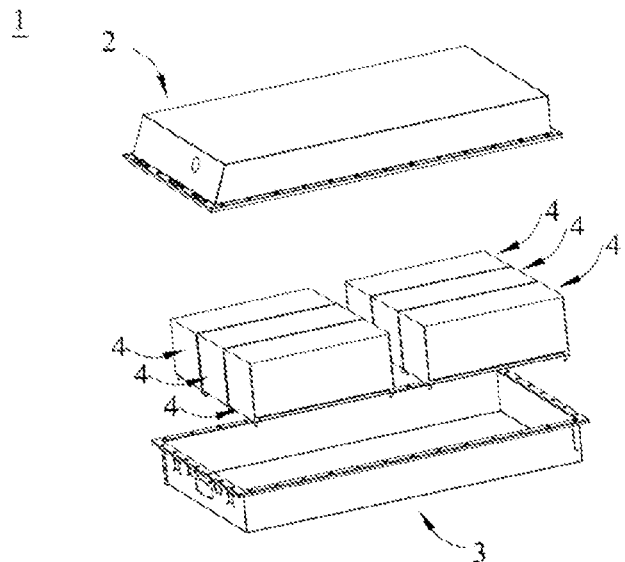
FIG. 5 is an exploded view of FIG. 4.

FIGS. 4 and 5 are the battery pack 1 as an example. Referring to FIGS. 4 and 5, the battery pack 1 may comprise a battery case and a plurality of battery modules 4 provided in the battery case. The battery case comprises an upper case 2 and a lower case 3. The upper box case 2 can be covered on the lower case 3 and forms a closed space for accommodating the battery module 4. Multiple battery modules 4 can be arranged in the battery box in any manner.

Apparatus

The present application further provides an apparatus comprising the secondary battery of the present application. The secondary battery can be used as a power source of the apparatus, and can also be used as an energy storage unit of the apparatus. The apparatus can be, but is not limited to, mobile apparatus (such as mobile phones, notebook computers), electric vehicles (such as pure electric vehicles, hybrid electric vehicles, plug-in hybrid electric vehicles, electric bicycles, electric scooters, electric golf carts, electric trucks), electric trains, ships and satellites, energy storage systems, etc.

A secondary battery, a battery module, or a battery pack can be selected to be used according to the usage requirements of the apparatus.

Figure 6:
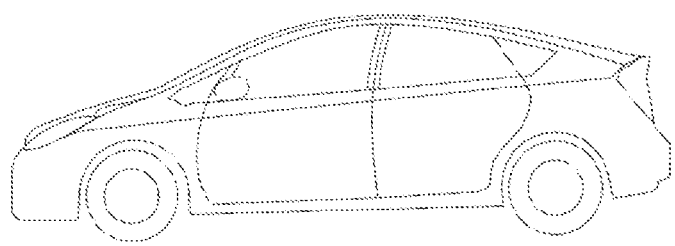
FIG. 6 is a schematic diagram of an embodiment of an apparatus using the secondary battery as a power supply.

FIG. 6 is an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module can be used.

As another example, the apparatus may be a mobile phone, a tablet computer, a notebook computer, etc. The apparatus is generally required to be thin and light, and a secondary battery can be used as a power source.

EXAMPLE

The following examples are intended to describe the disclosure of the present application, and are intended to be illustrative only, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

1) Preparation of Positive Electrode Plate

A positive active material $LiNi_{0.8}Mn_{0.1}Co_{0.1}O_2$ (NMC811), a conductive agent SP, and a binder PVDF were mixed at a weight ratio of 95:1.5:3.5 in an appropriate amount of NMP to form a uniform positive electrode slurry; The positive electrode slurry was coated on a positive electrode current collector aluminum foil, dried and cold pressed to obtain a positive electrode plate.

2) Preparation of Negative Electrode Plate

As shown in Table 1, a negative active material, conductive agent SP and CNT, and a binder sodium polyacrylate (PAAS) in a certain weight ratio (see Table 1 for details) were mixed in an appropriate amount of deionized water to form a uniform negative electrode slurry; the negative electrode slurry was coated on a negative electrode current collector copper foil, after drying and cold pressing, a negative electrode plate was obtained. At the same time, the value of the voltage U was adjusted by the way of pre-replenishing lithium on the electrode plate.

3) A polyethylene (PE) film was used as a separator.

4) Preparation of Electrolyte

Ethylene carbonate (EC), ethyl methyl carbonate (EMC), and diethyl carbonate (DEC) were mixed in a volume ratio of EC:EMC:DEC=1:1:1 to obtain an organic solvent. A lithium salt $LiPF_6$ was dissolved in the organic solvent, and then fluoroethylene carbonate (FEC) was added, and the electrolyte was obtained after uniform mixing. The concentration of $LiPF_6$ was 1 mol/L, and the mass percentage of FEC in the electrolyte was 6%.

5) The above positive electrode plate, the separator, a lithium metal reference electrode, the separator, and the negative electrode plate were stacked in order to obtain an electrode assembly after winding. The electrode assembly was put into the outer packaging, the above electrolyte was added and sealed to obtain a secondary battery.

Wherein, the above-mentioned negative electrode plate satisfied: when the above-mentioned negative electrode plate, the electrolyte (the electrolyte prepared in the above step 4)), and a lithium metal counter electrode were made into a button cell, and the button cell was subjected to constant-current lithium intercalation at a rate of 0.1 C to a voltage of 0.005V, and then subjected to constant-current lithium intercalation at a rate of 0.05 C to a voltage of 0.005V, and then subjected to constant-current lithium deintercalation at a rate of 0.1 C to a voltage of 1.2V, the delithiation capacity of the negative electrode film in the voltage range of 0.005V to the delithiation platform voltage was defined as A, and the delithiation capacity of the negative electrode film in the voltage range of the delithiation platform voltage to 1.2V was defined as B.

The battery of Example 1 satisfied both ① and ②
① A/B=1.0;
② When the battery was discharged to a voltage of 2.5V, the voltage U of the negative electrode plate relative to the lithium metal reference electrode was 0.6V.

The preparation methods of Examples 2 to 23 and Comparative Examples 1 to 4 were similar to those of Example 1, and the different product parameters were shown in Table 1.

Test for initial coulombic efficiency and cycle performance of secondary battery Under a normal pressure environment at 25° C., the secondary batteries of Examples 1 to 23 and Comparative Examples 1 to 4 were charged at a constant current rate of 0.1 C to 4.25V, and then charged at a constant voltage to a current of 0.05 C, and then was left for 5 minutes. The charge capacity at this time was recorded as the first charge capacity; then the secondary batteries were discharged to 2.5V at a constant current rate of 0.1 C, and then left for 5 minutes. This procedure formed a charge and discharge cycle. The discharge capacity at this time was recorded as the first discharge capacity. The secondary battery was subjected to 300 cycles of charge and discharge tests following the procedure described above, and the discharge capacity for each cycle was recorded.

Weight energy density of battery (Wh/kg)=first discharge energy/battery weight

The initial coulombic efficiency of battery (%)=first discharge capacity/first charge capacity×100%

Capacity retention rate of battery (%)=discharge capacity for the 300$^{th}$ cycle/discharge capacity for the first cycler×100%

TABLE 1

| | No. | Positive electrode Positive active material | Negative active material | ω (%) | Negative active material (%) | PAAS (%) | SP (%) | CNT (%) | A/B | U (V) | CB 值 |
|---|---|---|---|---|---|---|---|---|---|---|---|
| Example | 1 | $LiNi_{0.8}Co_{0.1}Mn_{0.1}O_2$ | SiO + Artificial graphite | 40 | 90 | 7 | 2 | 1 | 1.0 | 0.6 | 1.14 |
| | 2 | $LiNi_{0.8}Co_{0.1}Mn_{0.1}O_2$ | SiO + Artificial graphite | 35 | 90.65 | 6.5 | 1.9 | 0.95 | 1.1 | 0.6 | 1.14 |
| | 3 | $LiNi_{0.8}Co_{0.1}Mn_{0.1}O_2$ | SiO + Artificial graphite | 30 | 91.3 | 6 | 1.8 | 0.9 | 1.2 | 0.6 | 1.14 |
| | 4 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.14 |
| | 5 | $LiNi_{0.8}Co_{0.1}Mn_{0.1}O_2$ | SiO + Artificial graphite | 20 | 92.6 | 5 | 1.6 | 0.8 | 1.4 | 0.6 | 1.14 |
| | 6 | $LiNi_{0.8}Co_{0.1}Mn_{0.1}O_2$ | SiO + Artificial graphite | 15 | 93.25 | 4.5 | 1.5 | 0.75 | 1.5 | 0.6 | 1.14 |
| | 7 | $LiNi_{0.8}Co_{0.1}Mn_{0.1}O_2$ | SiO + Artificial graphite | 10 | 93.9 | 4 | 1.4 | 0.7 | 1.6 | 0.6 | 1.14 |
| | 8 | $LiNi_{0.8}Co_{0.1}Mn_{0.1}O_2$ | SiO + Artificial graphite | 7 | 94.55 | 3.5 | 1.3 | 0.65 | 1.8 | 0.6 | 1.14 |
| | 9 | $LiNi_{0.8}Co_{0.1}Mn_{0.1}O_2$ | SiO + Artificial graphite | 5 | 95.2 | 3 | 1.2 | 0.6 | 2.0 | 0.6 | 1.14 |
| | 10 | $LiNi_{0.8}Co_{0.1}Mn_{0.1}O_2$ | SiO + Artificial graphite | 25 | 91.95 | 5.5 | 1.7 | 0.85 | 1.3 | 0.7 | 1.14 |
| | 11 | $LiNi_{0.8}Co_{0.1}Mn_{0.1}O_2$ | SiO + Artificial graphite | 25 | 91.95 | 5.5 | 1.7 | 0.85 | 1.3 | 0.65 | 1.14 |
| | 12 | $LiNi_{0.8}Co_{0.1}Mn_{0.1}O_2$ | SiO + Artificial graphite | 25 | 91.95 | 5.5 | 1.7 | 0.85 | 1.3 | 0.55 | 1.14 |
| | 13 | $LiNi_{0.8}Co_{0.1}Mn_{0.1}O_2$ | SiO + Artificial graphite | 25 | 91.95 | 5.5 | 1.7 | 0.85 | 1.3 | 0.5 | 1.14 |
| | 14 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.05 |

TABLE 1-continued

| | | | | | Negative electrode | | | | | | |
| | | | | | Percentage of each component in the negative electrode film | | | | | | |
| No. | | Positive electrode Positive active material | Negative active material | ω (%) | Negative active material (%) | PAAS (%) | SP (%) | CNT (%) | A/B | U (V) | CB 值 |
|---|---|---|---|---|---|---|---|---|---|---|---|
| | 15 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.1 |
| | 16 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.13 |
| | 17 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.15 |
| | 18 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.18 |
| | 19 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.2 |
| | 20 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.25 |
| | 21 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.3 |
| | 22 | $LiNi_{0.8}Co_{0.1}Mn_{0.1}O_2$ | SiO + Artificial graphite | 25 | 91.95 | 5.5 | 1.7 | 0.85 | 1.3 | 0.6 | 1.4 |
| | 23 | $LiNi_{0.85}Co_{0.15}Al_{0.05}O_2$ | SiO + Artificial graphite | 25 | 91.95 | 5.5 | 1.7 | 0.85 | 1.3 | 0.6 | 1.14 |
| Comparative Example | 1 | $LiNi_{0.8}Co_{0.1}Mn_{0.1}O_2$ | SiO + Artificial graphite | 25 | 90 | 7 | 2 | 1 | 2.1 | 0.6 | 1.14 |
| | 2 | $LiNi_{0.8}Co_{0.1}Mn_{0.1}O_2$ | SiO + Artificial graphite | 25 | 95.5 | 3 | 1 | 0.5 | 0.9 | 0.6 | 1.14 |
| | 3 | $LiNi_{0.8}Co_{0.1}Mn_{0.1}O_2$ | SiO + Artificial graphite | 25 | 91.95 | 5.5 | 1.7 | 0.85 | 1.3 | 0.75 | 1.14 |
| | 4 | $LiNi_{0.8}Co_{0.1}Mn_{0.1}O_2$ | SiO + Artificial graphite | 25 | 91.95 | 5.5 | 1.7 | 0.85 | 1.3 | 0.45 | 1.14 |

In Table 1, ω was the mass percentage of silicon-oxygen compound (i.e., SiO) in the negative active material.

TABLE 2

| No. | Weight energy density of battery (Wh/kg) | Initial coulombic efficiency (%) | Capacity retention rate after 30 cycles (%) |
|---|---|---|---|
| Example 1 | 309 | 89.1 | 88.9 |
| Example 2 | 306 | 89.4 | 94.5 |
| Example 3 | 303 | 90.4 | 95.1 |
| Example 4 | 302 | 90.5 | 95.6 |
| Example 5 | 297 | 90.1 | 95.7 |
| Example 6 | 293 | 89.7 | 95.9 |
| Example 7 | 288 | 89.3 | 94.8 |
| Example 8 | 282 | 89.5 | 90.4 |
| Example 9 | 279 | 89.0 | 89.1 |
| Example 10 | 300 | 87.2 | 93 |
| Example 11 | 301 | 88.0 | 94.8 |
| Example 12 | 297 | 90.7 | 95.8 |
| Example 13 | 293 | 90.9 | 95.9 |
| Example 14 | 304 | 89.8 | 92.2 |
| Example 15 | 302 | 89.4 | 95.4 |
| Example 16 | 301 | 89.5 | 95.7 |
| Example 17 | 300 | 90.2 | 95.9 |
| Example 18 | 298 | 90.0 | 96 |
| Example 19 | 297 | 89.5 | 96.3 |
| Example 20 | 291 | 89.5 | 96.5 |
| Example 21 | 285 | 89.3 | 96.9 |
| Example 22 | 280 | 89.0 | 97.1 |
| Example 23 | 305 | 89.5 | 92.7 |
| Comparative Example 1 | 288 | 89.4 | 85 |
| Comparative Example 2 | 279 | 89.5 | 86.3 |
| Comparative Example 3 | 282 | 86.7 | 84.4 |
| Comparative Example 4 | 283 | 90.9 | 82.7 |

It can be seen from the test results in Table 2 that the positive active material of the secondary battery comprising one or more of layered lithium nickel cobalt manganese oxide and layered lithium nickel cobalt aluminum oxide, and the negative active material comprising silicon-oxygen compound and graphite, can make the battery have a higher energy density; by making the secondary battery meet both the A/B value of the negative electrode film and the voltage U value of the negative electrode within a specific range, the battery's cycle capacity retention rate was obviously increased, effectively improving the cycle performance of the battery, in particular, further increasing the energy density of the battery.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A secondary battery, comprising a positive electrode plate, a negative electrode plate, a separator and an electrolyte, wherein:
the positive electrode plate comprises a positive electrode current collector and a positive electrode film disposed on at least one surface of the positive electrode current collector, comprising a positive active material, and
the negative electrode plate comprises a negative electrode current collector and a negative electrode film disposed on at least one surface of the negative electrode current collector, comprising a negative active material;
wherein:
the positive active material comprises one or more of layered lithium nickel cobalt manganese oxide and layered lithium nickel cobalt aluminum oxide;
the negative active material comprises graphite and silicon-oxygen compound $SiO_x$, in which $0<x<2$;
when a button battery made from the negative electrode plate and a lithium metal sheet is subjected to constant-current lithium intercalation at a rate of 0.1 C to a voltage of 0.005V, and then subjected to constant-current lithium intercalation at a rate of 0.05 C to a voltage of 0.005V, and then subjected to constant-current lithium deintercalation at a rate of 0.1 C to a voltage of 1.2V, a ratio of total delithiation energy of the negative electrode film to total delithiation capacity in the voltage range of 0.005V to 1.2V is defined as the delithiation platform voltage, and the delithiation capacity of the negative electrode film in the voltage range of 0.005V to the delithiation platform voltage is defined as A, and the delithiation capacity of the negative electrode film in the voltage range of the delithiation platform voltage to 1.2V is defined as B, and A and B satisfy: $1 \leqslant A/B \leqslant 2$;
when the secondary battery is discharged to a voltage of 2.5V, a voltage U of the negative electrode plate relative to a lithium metal reference electrode satisfies: $0.5V \leqslant U \leqslant 0.7V$;
a mass percentage ω of the silicon-oxygen compound in the negative active material satisfies $15\% \leqslant \omega \leqslant 35\%$;
a mass percentage of the negative active material in the negative electrode film is from 90.65% to 95.2%;
the secondary battery has a coefficient of excess capacity from 1.15 to 1.25.

2. The secondary battery according to claim 1, wherein A and B satisfy: $1.1 \leqslant A/B \leqslant 1.6$.

3. The secondary battery according to claim 1, wherein when the secondary battery is discharged to a voltage of 2.5V, a voltage U of the negative electrode plate relative to a lithium metal reference electrode satisfies: $0.55V \leqslant U \leqslant 0.65V$.

4. The secondary battery according to claim 1, wherein the graphite is selected from one or more of artificial graphite and natural graphite.

5. The secondary battery according to claim 1, wherein the negative active material further satisfies one or more of the following aspects:
the negative active material has an average particle size $D_v50_a$ from 5 μm to 20 μm;
the silicon-oxygen compound has an average particle size $D_v50_b$ from 3 μm to 12 μm;
the graphite has an average particle size $D_v50_c$ from 5 μm to 18 μm.

6. The secondary battery according to claim 1, wherein the lithium nickel cobalt manganese oxide is selected from one or more of the compounds represented by Formula 1 and a surface coating modified compounds thereof, $$Li_aNi_bCo_cMn_dM^1_eO_fA_g \qquad \text{Formula 1,}$$

in Formula 1, $0.8 \leqslant a \leqslant 1.2$, $0.5 \leqslant b<1$, $0<c<1$, $0<d<1$, $0 \leqslant e \leqslant 0.1$, $1 \leqslant f \leqslant 2$, $0 \leqslant g \leqslant 1$, $M^1$ is selected from one or more of Zr, Al, Zn, Cu, Cr, Mg, Fe, V, Ti, and B, and A is selected from one or more of N, F, S, and Cl; and/or,
the lithium nickel cobalt aluminum oxide is selected from one or more of the compounds represented by Formula 2 and the surface coating modified compounds thereof, $$Li_\alpha Ni_\beta Co_\gamma Al_\delta M^2_\varepsilon O_\nu X_\sigma \qquad \text{Formula 2,}$$

in Formula 2, $0.8 \leqslant \alpha \leqslant 1.2$, $0.5 \leqslant \beta<1$, $0<\gamma<1$, $0<\delta<1$, $0 \leqslant \varepsilon \leqslant 0.1$, $1 \leqslant \nu \leqslant 2$, $0 \leqslant \sigma \leqslant 1$, $M^2$ is selected from one or more of Zr, Mn, Zn, Cu, Cr, Mg, Fe, V, Ti, and B, and X is selected from one or more of N, F, S, and Cl.

7. The secondary battery according to claim 1, wherein at least a part of the positive active material has a single-particle morphology.

8. The secondary battery according to claim 1, wherein the negative electrode film has an areal density p satisfying $7 \text{ mg/cm}^2 \leqslant p \leqslant 10 \text{ mg/cm}^2$.

9. A battery module comprising the secondary battery according to claim 1.

10. A battery pack comprising the battery module of claim 9.

11. An apparatus comprising the secondary battery according to claim 1.

12. The secondary battery according to claim 1, wherein A and B satisfy: $1.2 \leqslant A/B \leqslant 1.5$.

13. The secondary battery according to claim 1, wherein the negative active material further satisfies one or more of the following aspects:
the negative active material has an average particle size $D_v50_a$ from 6 μm to 15 μm;
the silicon-oxygen compound has an average particle size $D_v50_b$ from 4 μm to 10 μm;
the graphite has an average particle size $D_v50_c$ from 6 μm to 15 μm.

14. The secondary battery according to claim 1, wherein the negative electrode film has an areal density p satisfying $7 \text{ mg/cm}^2 \leqslant p \leqslant 9 \text{ mg/cm}_2$.

* * * * *